United States Patent [19]  
Hashimoto et al.

[11] 4,096,063  
[45] Jun. 20, 1978

[54] PROCESS FOR SEPARATING FLOC AND APPARATUS

[75] Inventors: Katsuhiro Hashimoto, Yamamto; Takao Hasegawa, Tokyo, both of Japan

[73] Assignee: Suido Kiko Kabushiki Kaisha, Tokyo, Japan

[21] Appl. No.: 736,363

[22] Filed: Oct. 28, 1976

[30] Foreign Application Priority Data

Nov. 6, 1975    Japan .................................. 50-132439

[51] Int. Cl.² ............................................. B01D 21/08
[52] U.S. Cl. ........................................ 210/84; 210/521
[58] Field of Search ................... 210/83, 84, 521, 522

[56] References Cited

U.S. PATENT DOCUMENTS

| | | | |
|---|---|---|---|
| 2,751,998 | 6/1956 | Glasgow | 210/521 X |
| 3,385,439 | 5/1968 | Bach | 210/522 |
| 3,460,677 | 8/1969 | Fifer | 210/521 X |
| 3,491,892 | 1/1970 | McCann | 210/521 |
| 3,521,756 | 7/1970 | Kaminsky | 210/521 |
| 3,741,401 | 6/1973 | Hsiunj | 210/521 |
| 3,837,501 | 9/1974 | Pielkenrood | 210/522 |
| 3,898,164 | 8/1975 | Hsiunj | 210/521 |
| 3,963,624 | 6/1976 | Henderson et al. | 210/521 |
| 3,975,276 | 8/1976 | Schmid | 210/521 |

Primary Examiner—Theodore A. Granger  
Attorney, Agent, or Firm—Toren, McGeady and Stanger

[57] ABSTRACT

The present invention provides a process for separating floc in a liquid and for accomplishing the sedimentation of the floc, and provides an apparatus for carrying out the same. In the present invention, a plurality of partition chambers having a narrow gap and being constructed in a square and tubular shape is formed by a plurality of separate plates in the settling tank and a plurality of fins to hit the floc against the fin thereby catching effectively the floc suspended in the mother liquid and separating smoothly and accomplishing the sedimentation of the floc.

4 Claims, 13 Drawing Figures

PROCESS FOR SEPARATING FLOC AND APPARATUS

BACKGROUND OF THE INVENTION

The present invention relates to a process for separating floc in a liquid and for accomplishing the sedimentation of the floc and an apparatus for carrying out the same. More particularly the invention relates to a process for accomplishing the sedimentation of the floc wherein a plurality of partition chambers comprising of a plurality of separate plates and a plurality of fins, have a narrow gap, so that the floc suspended in the mother liquid is caught in an eddy current occurring in the partition chamber while the floc is swirling downwardly in the partition chamber and the floating floc accumulates by contacting each other.

Prior Japanese patent publication No. 6663/1975 entitled "Floc Separating Apparatus" discloses features in which, the apparatus for separating solid from liquid includes a passage of mixture to be separated by arranging thin plates at proper intervals in parallel with each other and a pocket formed by protruding a fin from each thin plate in the passage. The improvement provides for the passage to be kept in a substantially horizontal condition to the weight direction by forming in many steps of thin plates. The pocket has an opening at the upper end arranged vertically to the flowing direction with fins on the partition wall by hanging down the fins on the upper surface only of the thin plates. And, the object thereof is to provide a plurality of fins hitting the liquid against the passage of separating layer in the settling tank thereby providing a change in the flowing condition of moving mother liquid with suspended floc therein to accomplish the sedimentation and separation in different conditions from the prior by providing a local stationary region. Thus, according to the publication, there is an advantage of reducing the size of the settling tank by increasing the catching effect of fine floc in the arrangement in the rear portion in the settling tank.

However, it should be understood that there is a disadvantage of ineffective results due to the accumulation and sticking of impurities in the liquid. A large amount of floating materials occur. The floc caught by the eddy current results from erect fins so that when the floc is separated in a downward sliding action on the oblique plate having a plurality of fins, separation is not carried out effectively due to the floating materials. It has therefore been found that a desired separating effect cannot be obtained even though the separating partition chamber is vertically provided in the beginning step of separation.

SUMMARY OF THE INVENTION

An object of the present invention is to provide a process for separating the floc in the liquid and for accomplishing the sedimentation of the floc and apparatus for carrying out the same in which a plurality of regular partition chambers is arranged in the liquid to effectively produce an eddy current even though impurities in the liquid like drainage or sewage, suspended large amounts of floating materials, to insure good separation of the floc.

Another object of the present invention is to provide a process for separating the floc in the liquid and for accomplishing the sedimentation of the floc and apparatus for carrying out the same in which partition chambers are substantially vertically arranged without any occurrences of accumulation, stick and closure of the floating matters even though the separation of floating matters has occurred.

A further object of the present invention is to provide a process for separating floc in the liquid and for accomplishing the sedimentation of the floc and apparatus for carrying out the same in which a separate plate is provided and is made of rigid material and hangs down into the settling tank to provide a simple design.

An additional object of the present invention is to provide a process for separating floc in the liquid and for accomplishing the sedimentation of the floc and apparatus for carrying out the same in which a relatively small arrangement in the corresponding space area is provided to accomplish effectively the separation of solid from the liquid to achieve economic advantages.

BRIEF DESCRIPTION OF THE DRAWING

These and other objects, features and advantages of the invention will become more apparent upon a reading of the following detailed specification and drawings, wherein;

FIGS. 1 and 2 show the first embodiment of the present invention in which FIG. 1 is a perspective view thereof and FIG. 2 is a reduced plan view;

FIGS. 3 and 4 show the second embodiment of the present invention in which FIG. 3 is a perspective view thereof and FIG. 4 is a reduced plan view;

FIGS. 6 and 7 show the fourth embodiment of the present invention in which FIG. 6 is a perspective view thereof and FIG. 7 is a reduced plan view;

FIGS. 10 and 11 are explanatory views showing floc sedimentation conditions in which FIG. 10 is a prior view and FIG. 11 is a view of the present invention and FIGS. 12 and 13 show the seventh embodiment in accordance with the present invention in which FIG. 12 is a perspective view and FIG. 13 is a side elevation view.

Embodiment 1

Figure 1:
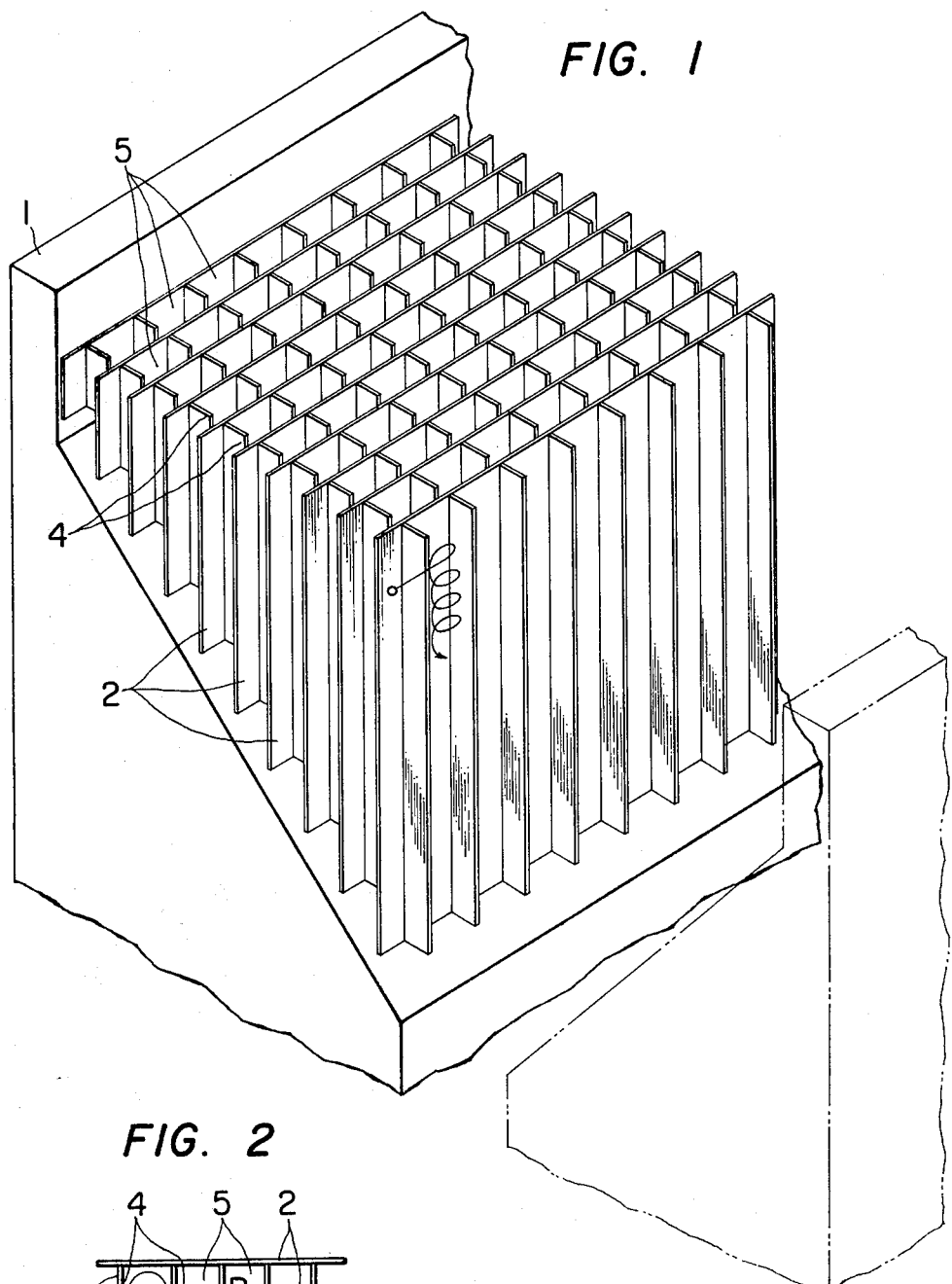
Figure 2:
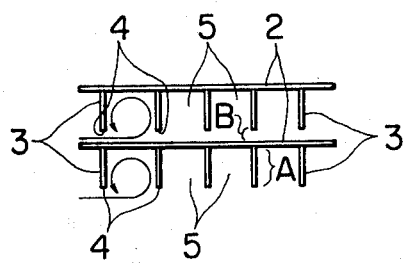

Referring to FIGS. 1 and 2, the reference numeral 1 indicates a settling tank or basin used in the present invention, 2 designates separate plates in the tank 1, each plate being made of rigid material such as vinyl chloride or the like. Each separate plate 2 is provided with a plurality of fins 3 which are made of rigid material like each separate plate 2 and positioned at desired intervals in the longitudinal direction and extends in the vertical direction to the surface of each separate plate 2. As seen in FIG. 2, each fin 3 has a height A which is preferably 60mm, the distance between each separate plate 2 is preferably 80mm, the thickness of each fin 3 is preferably 1.2mm, and a gap B between edge portion 4 of fin 3 and the plate 2 is preferably 20mm.

Again referring to FIG. 2, a partition chamber 5 is formed by the separate plate 2 and two fins 3, 3. The gap B is formed by the edge portion 4 and a separate plate 2 which is spaced a short distance from the edge portion 4.

Figure 10:
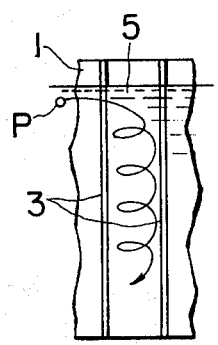
Figure 11:
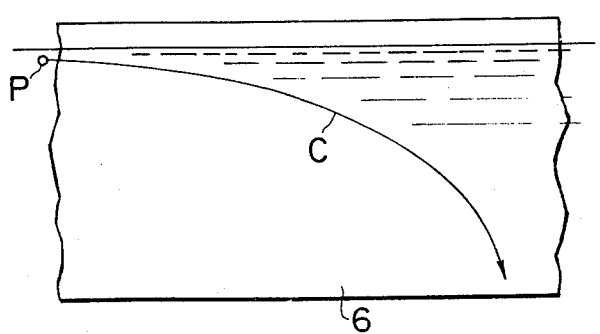

The first embodiment in accordance with the present invention operates as follows:

When a mother liquid with a large quantity of floc suspended therein is fed to the settling tank 1 at flow rate, such as 25cm/min., a portion of the mother liquid flows through the gap B and the substantial portion of the mother liquid hits the surface of each fin 3 to produce an eddy current. Subsequently, the mother liquid moves to the base of each fin 3 and flows to make a circuit in the inner part of the separate plate 2 after the mother liquid collides with the surface of the spearate plate 2 or the bottom of partition chamber 5. Furthermore, the mother liquid hits the back surface of each fin 3 to produce a swirling motion is regular conditions, namely to produce an eddy phenomenon. As a result, a large amount of flocs suspended in the mother liquid is caught in the partition chamber 5 by the eddy phenomenon, and the floc gradually descends by its own weight in the continuing of swirling motion, analogous to falling down spiral steps over a relatively long distance in the longitudinally extended partition chamber 5. The condition of swirling motion of the floc is shown in FIGS. 10 and 11. FIG. 11 shows the prior condition in which a floc particle P flows along a slowly descending curve C in the transversely flowing settling basin 6. FIG. 10 however, shows the condition in accordance with the present invention, in which the floc particle P behaves within the square and tubular partition chamber 5 and the sedimentation rate of floc is gradually increased after contacting the floc with fine floc particles in the swirling motion of the floc particle P. On the other hand, the floc not having entered the former partition chamber, is gradually caught in the latter partition chamber because the partition chamber is arranged in many steps with respect to the direction of flow to accomplish good separation of the floc.

The following table shows experimental results in a cleaning bed.

|  | Amount to be treated (l/min) | Flow rate in the arrangement of the present invention (m/min) | Pouring degree of condensation agent (P.A.C.:p.p.m.) | Water temperature (° C) | Impurity degree of the entrance (JTU:p.p.m.) | Impurity degree after the partition chamber passed (JTU:p.p.m.) Number of partition chamber passed | | | Removal degree of impurity (%) |
|---|---|---|---|---|---|---|---|---|---|
|  |  |  |  |  |  | 5 | 10 | 15 |  |
| I. | 22.5 | 0.25 | 50 | 12.8 | 110 | 27 | 18 | 18 | 83.6 |
| II. | 22.5 | 0.25 | 30 | 9.7 | 52 | 22 | 15 | 7.8 | 85.0 |
| III. | 15.0 | 0.17 | 50 | 12.0 | 110 | 32.5 | 22 | 19 | 82.7 |
| IV. | 15.0 | 0.17 | 30 | 9.5 | 62 | 16 | 12 | 8.4 | 86.4 |
| V. | 15.0 | 0.17 | 30 | 10.2 | 18 | 12 | 8 | 5.3 | 70.5 |

As understood from the above table, it should be clearly appreciated that the removal degree of impurity reaches beyond 80% after the mother liquid of high impurity degree has passed the fifteenth partition chamber. It has been found that this process achieves an excellent advantage in the drainage or sewerage including plenty of drawing or sewage.

Embodiment 2

Figure 3:
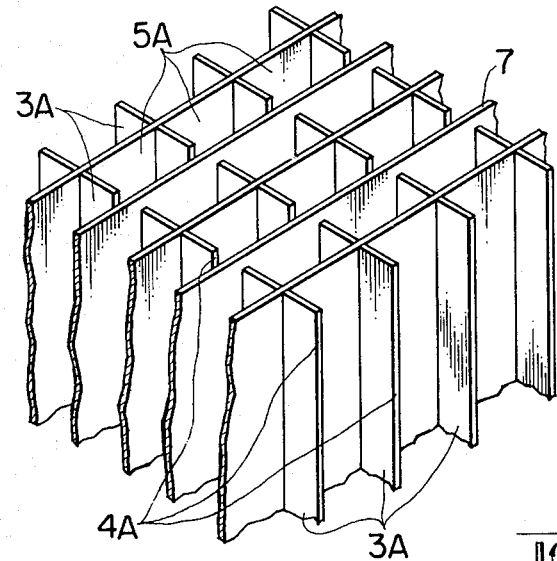
Figure 4:
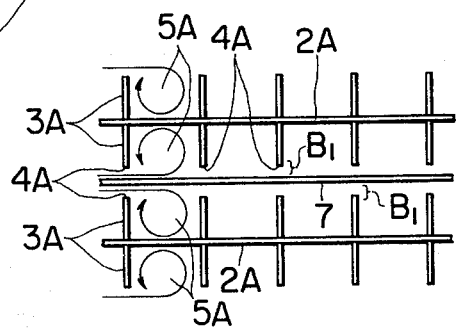

Referring to FIGS. 3 and 4, this embodiment includes a flat plate 7 made of rigid material such as vinyl chloride or the like positioned between each separate plate 2A, 2A. Plate 7 is arranged in parallel with the longitudinal direction of the separate plate 2A and the separate plate 2A being provided with a plurality of fins 3A in the vertical direction and in cross condition on both sides thereof. A short distance $B_1$ is provided between the edge portion 4A of each fin 3A and each flat plate 7 and the partition chamber 5A is formed on both sides of each separate plate 2A.

The experimental advantage in accordance with the second embodiment was substantially same with that of the first embodiment.

Embodiment 3

Figure 5:
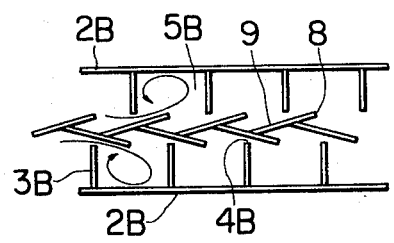
FIG. 5 is a plan view of the third embodiment in accordance with the present invention.

Referring to FIG. 5, this embodiment includes an oblique guide blade 8 to each plate 9, which corresponds to the flat plate 7 in the second embodiment. This arrangement is instead of the flat plate 7.

According to this embodiment, the passing of a light and fine floc without being caught in the system of the partition chambers 5B, is avoided. The floc is easily and quickly guided into the partition chamber 5B by the deflecting action of the arrangement of the oblique guide blade 8 and of the plate 9. Reference numerals 2B, 3B and 4B indicate the separate plate, the fin and edge portion of the fin, respectively.

Embodiment 4

Figure 6:
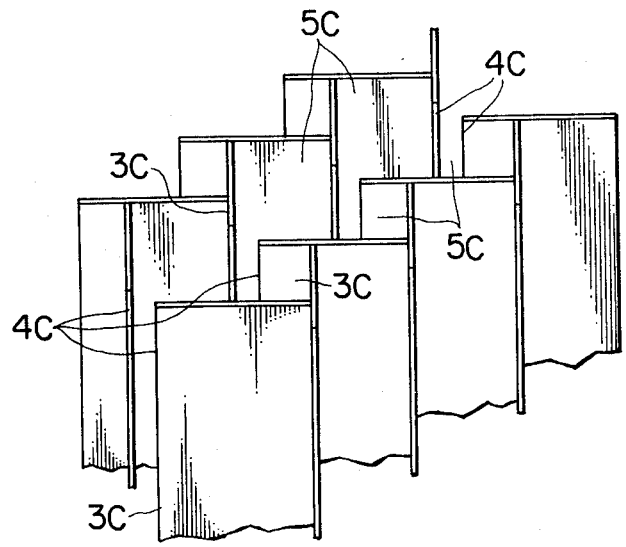
Figure 7:
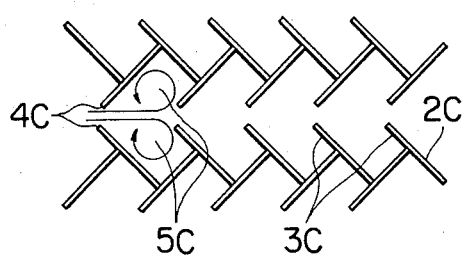

Referring to FIGS. 6 and 7, this embodiment includes a partition chamber 5C each comprising a bending plate 2C and a fin 3C. The opening of the partition chamber 5C is formed in a canopied condition to effectively catch the fine floc. The reference numeral 4C indicates the edge portion of fin 3C.

Embodiment 5

Figure 8:
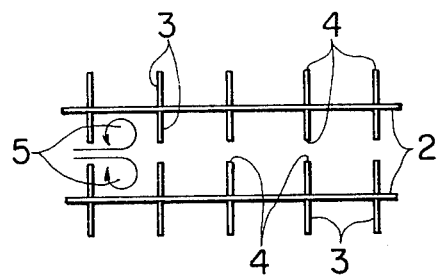
FIG. 8 is a plan view of the fifth embodiment in accordance with the present invention.

Referring to FIG. 8, this embodiment shows an arrangement without a flat plate 7 as in the second embodiment. The edge portions 4 of each fin 3 are closely spaced to produce a sharp eddy current.

Embodiment 6

Figure 9:
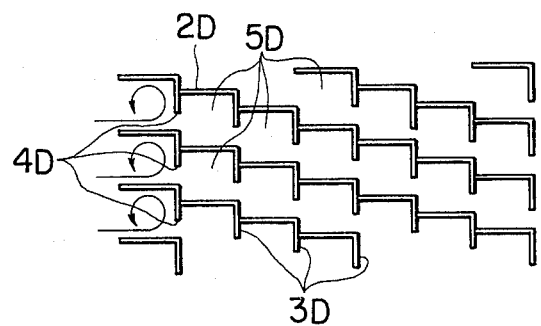
FIG. 9 is a plan view of the sixth embodiment in accordance with the present invention.

Referring to FIG. 9, this embodiment shows an arrangement of a partition chamber 5D comprising separate plates 2D connected by the fin 3D with each other. Each fin 3D has an edge portion 4D, formed in substantially step arrangement to restrict smooth passing of fine floc in the partition chamber 5D.

Embodiment 7

Figure 12:
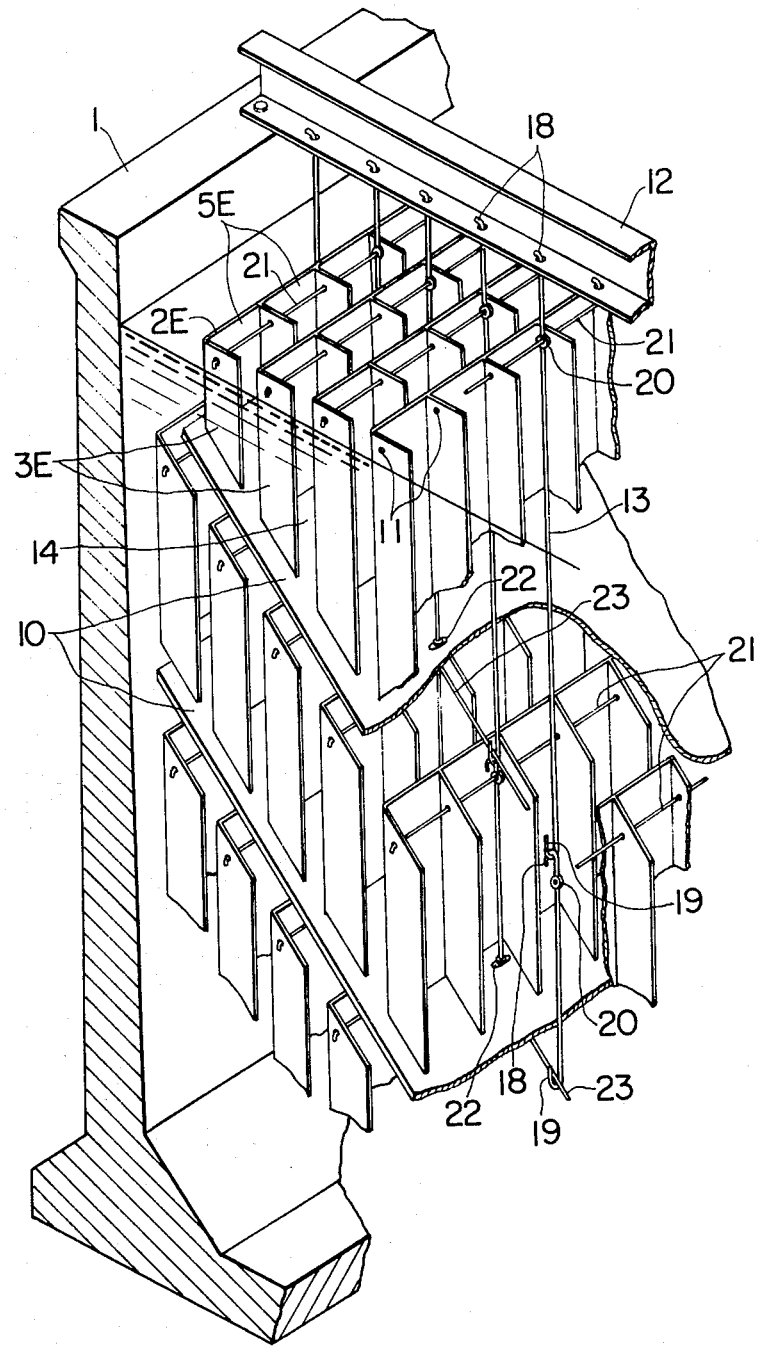
Figure 13:
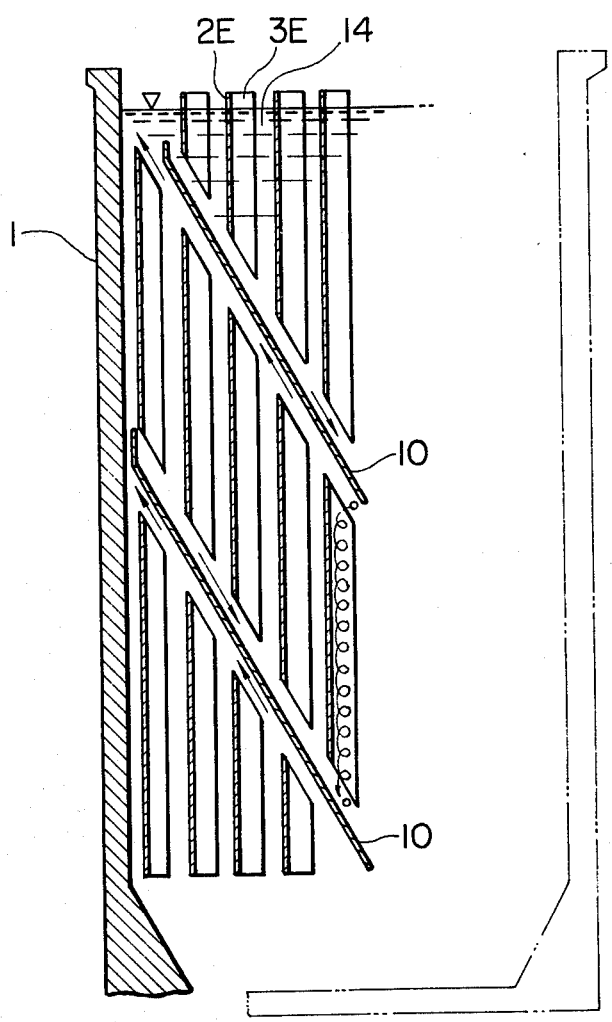

Referring to FIGS. 12 and 13, this embodiment shows a partition chamber 5E having a narrow opening in which an oblique plate 10 is provided just under each separate plate 2E to positively accomplish the sedimentation action of floc. Accordingly a relatively small size arrangement is obtained to shorten the distance of arrangement in the flowing direction. In the drawings, reference numeral 1 designates a settling tank or basin, 2E and 3E indicate each separate plate and each fin respectively, and the reference numeral 14 is a side opening of longitudinally long partition chamber 5E. Each oblique plate 10 is formed to connect each fin 3E with each other at the outer edge of each fin 3E. The upper surface of oblique plate 10 hangs down from the separate plate 2E, having each fin 3E, to effectively accomplish the sedimentation action of floc, thus providing a relatively small size arrangement. The reference numeral 11 indicates an inserting hole of through bar 21 provided at the upper end of fins 3E, 13 designates a stem hanging down from a beam 12 located at the upper part of tank 1. Each stem 13 has a hook 18 and 19 respectively at the upper and lower ends. The reference numeral 20 indicates a loop provided on the stem 13 at desired intervals to be open to the flowing direction. The forming surface of lower hook 19 is arranged in parallel to the flowing direction by its curved form. The corresponding surface of upper hook 18 is formed so as to be vertical to the flowing direction. In accordance with thus embodiment, the following arrangement is added, firstly the plain surface of the separate plate 2E hangs down in parallel with the flowing direction, secondly the inserting hole 11 of fin 3E is closely arranged in position with the loop 20 of stem 13, and thirdly the separate plate 2E is connected with the stem 13 by inserting the bar 21 into the hole 11 as shown in FIG. 12. In practice, it should be understood that the distance of gap between the edge portion of fin 3E and the plain surface of separate plate 2E is one-third of the height of fin 3E, for example, about 20mm. And, after the oblique plate 10 is pressed up from the lower of a group of separate plates 2E, the lower end of stem 13 is inserted into the aperture 22 to be drawn up therefrom and a supporting rod 23 is engaged with the lower end of stem 13 through the hook 19, thus the oblique plate 10 can be easily carried just under the separate plate 2E. Subsequently, the next stem 13 is engaged with the lower hook 19 of upper stem 13 through the upper hook 18, thus the necessary step of stem can be arranged by those skilled in the art and the arrangement of separate plate 2E and the oblique plate 10 can be constructed in the desired design according to the fitting of stem described in the above. In practice, it should be understood that the oblique plate 10 can be a corrugated plate instead of plain plate according to the necessity.

With the process and the apparatus of the present invention described above, an occurrence of eddy current is accomplished by arranging a plurality of regular partition chambers in the flowing condition to easily catch the floc in the mother liquid in order to separate it. The partition chamber is substantially vertically arranged in the settling tank, so we can expect that the occurrence of accumulation, stick and closure of floating material can be completely avoided even though plenty of floating material is separated from the mother liquid in the tank. Furthermore, the separate plate is made of rigid material and is vertically arranged in the tank, so the arrangement is very easily constructed in design and in assembling and is effectively separated from the mother liquid by the use of small dimensions in a small space to achieve economic advantages.

What is claimed is:

1. A process for separating floc in a liquid and for accomplishing sedimentation of said floc, comprising the steps of: passing said liquid into a settling tank having a plurality of partition chambers longitudinally arranged therein with respect to the direction of flow of said liquid, said chambers being formed by a plurality of fins carried on at least one side of separating walls vertically arranged in said tank and extending in a direction parallel to the direction of flow, the edges of said fins defining at least one side of narrow passages for the flow of liquid therethrough, forming eddy currents in said partition chambers, and hitting the floc suspended in said liquid against the surfaces of said fins causing said floc to be caught in said eddy currents, whereby said floc accumulates in said eddy currents by contact of floc particles with each other to cause sedimentation and separation thereof.

2. A process for separating floc in a liquid and for accomplishing sedimentation of said floc comprising the steps of: passing said liquid into a settling tank having a plurality of partition chambers arranged longitudinally to the direction of flow of said liquid therethrough, said chambers being formed by a plurality of fins on at least one side of separating walls vertically arranged in said tank and extending in a direction parallel to the direction of flow, the edges of said fins defining at least one side of a narrow passage for the flow of liquid therethrough, said partition chambers having an open side arranged opposite said separating walls with a narrow passage being formed between the edges of said fins and said separating walls for the passage of liquid, and a plurality of obliquely arranged plates positioned vertically beneath a set of separating walls, forming eddy currents in said partition chambers, and hitting the floc suspended in said liquid against said fins causing said floc to be caught in said eddy currents, whereby said floc accumulates in said eddy currents by contact of floc particles with each other to cause sedimentation and separation thereof.

3. An apparatus for causing sedimentation and separation of floc in a liquid comprising a settling tank, a plurality of vertically arranged separating walls within said settling tank, at least one fin carried on at least one side of said separating walls extending in a vertical direction and defining a plurality of longitudinally extending partition chambers, each chamber formed by spaced adjacent fins and at least one surface of one of said separating walls, said chamber having an open side facing in a direction generally transverse to the flow of liquid, and a plurality of narrow gaps one side of which being formed by the edges of said fins, whereby as said liquid with floc suspended therein passes through said settling tank it forms eddy currents in said partition chambers as a result of said liquid flowing into said chambers along said open side, said floc thereby hitting the surfaces of said fins and being caught in said eddy currents causing particles of said floc to accumulate and to descend within said chambers for sedimentation and separation from said liquid.

4. An apparatus for causing sedimentation and separation of floc in a liquid comprising a settling tank, a plurality of partition walls vertically arranged within said tank in a direction parallel to the direction of flow of the liquid through said tank, a plurality of fins carried on at least one side of said separating walls defining therebetween partition chambers being opened on one side thereof and arranged longitudinally along the direction of flow, a plurality of plates arranged obliquely to the separating walls and fins defining decks vertically positioned in said settling tank, and means for supporting said plates at desired intervals in the vertical direction, whereby eddy currents are formed in the open sided partition chambers as said liquid passes through said settling tank with particles of floc hitting the surfaces of said fins thereby being caused to accumulate and descend in said eddy currents for sedimentation and separation.

* * * * *